Feb. 7, 1939.  A. GARDIN ET AL  2,146,063
CARD SELECTING DEVICE
Filed Oct. 30, 1934  10 Sheets-Sheet 1
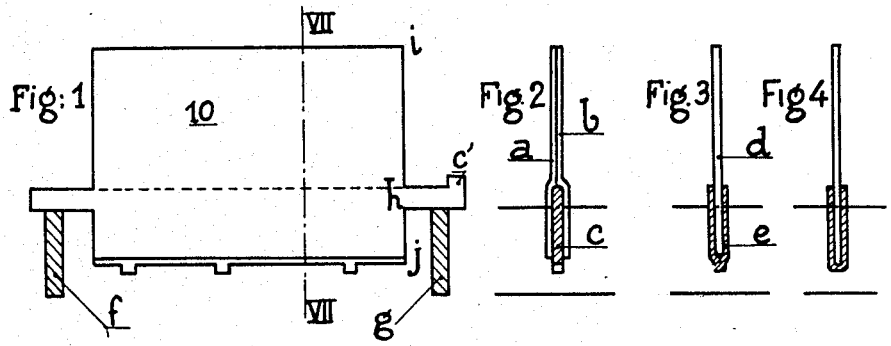
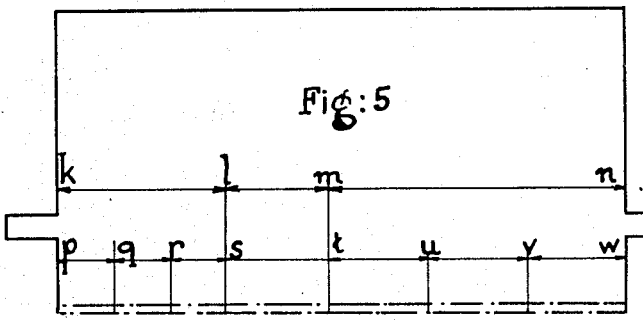
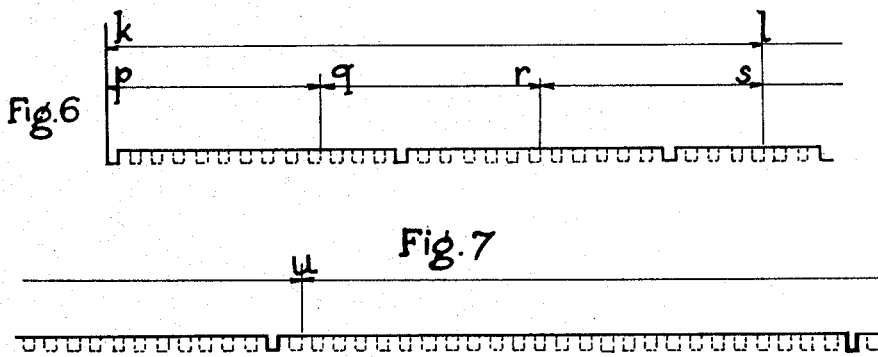
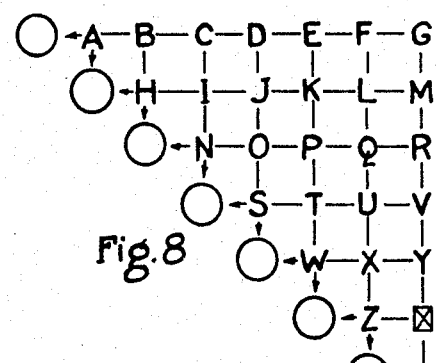
INVENTORS
A. Gardin.
R. Flahaut.
By Lacey & Lacey,
Attys.

Feb. 7, 1939.                 A. GARDIN ET AL                    2,146,063
                             CARD SELECTING DEVICE
                    Filed Oct. 30, 1934          10 Sheets-Sheet 2
Fig. 9
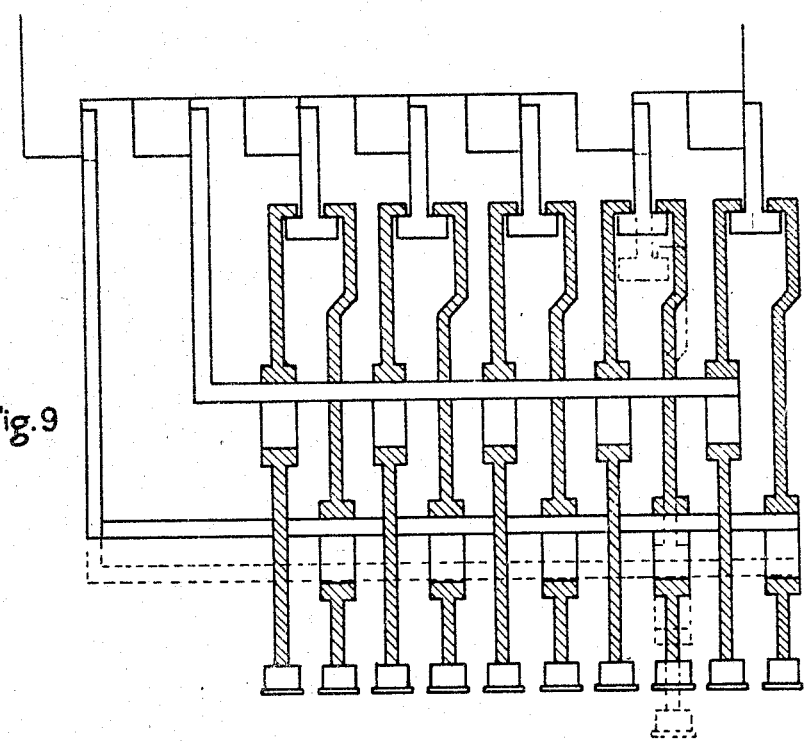
Fig. 10
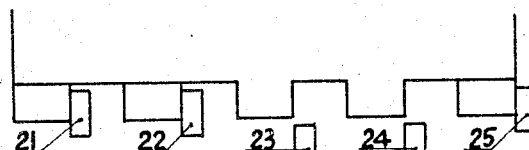
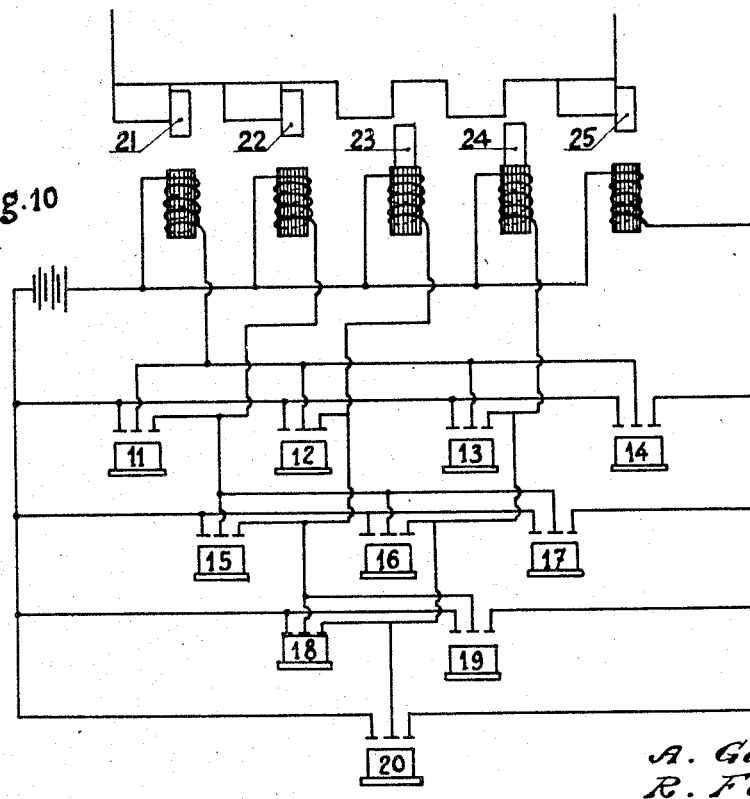
INVENTORS
A. Gardin.
R. Flahaut.
By Lacey & Lacey,
Attys.

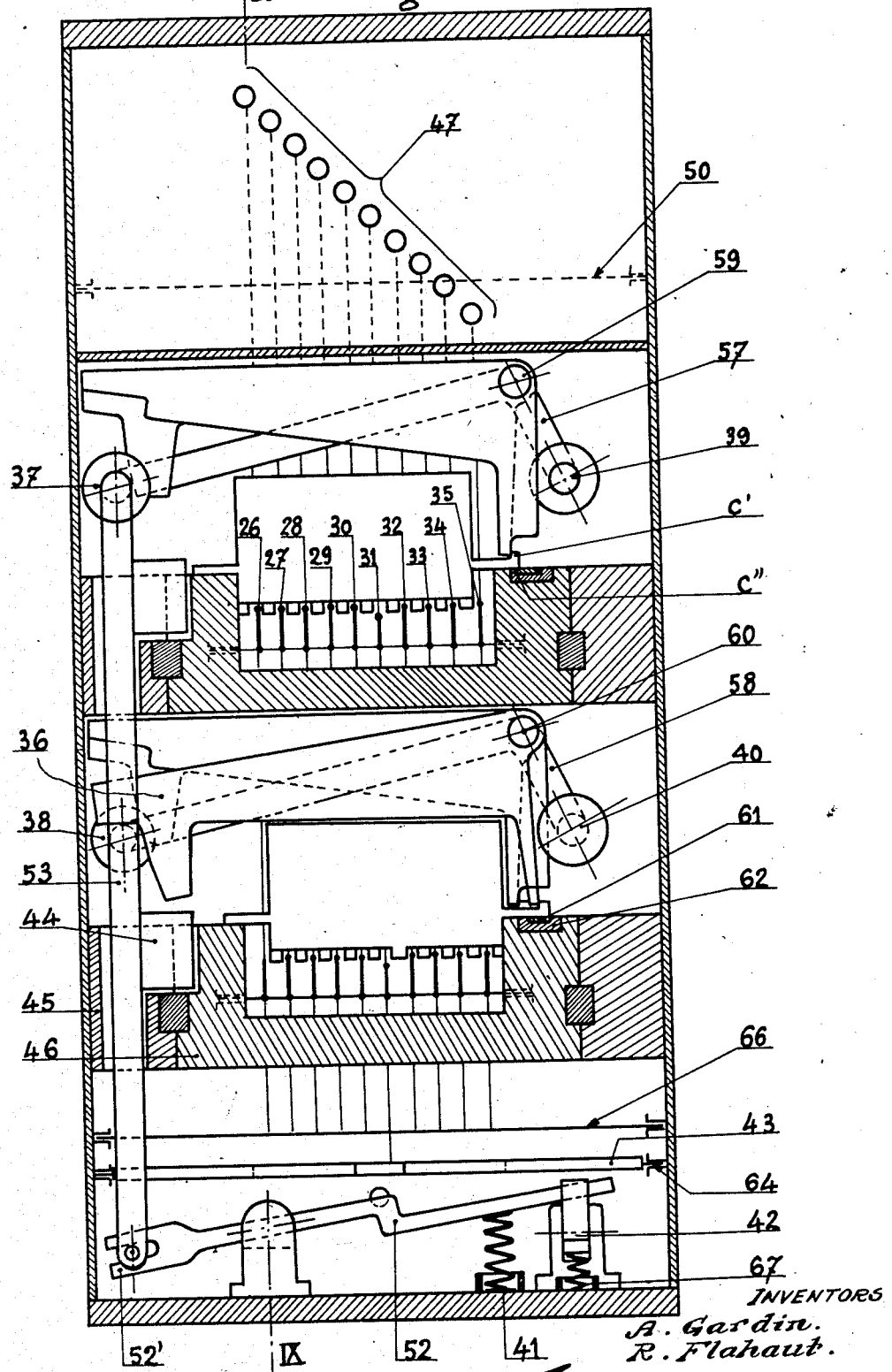

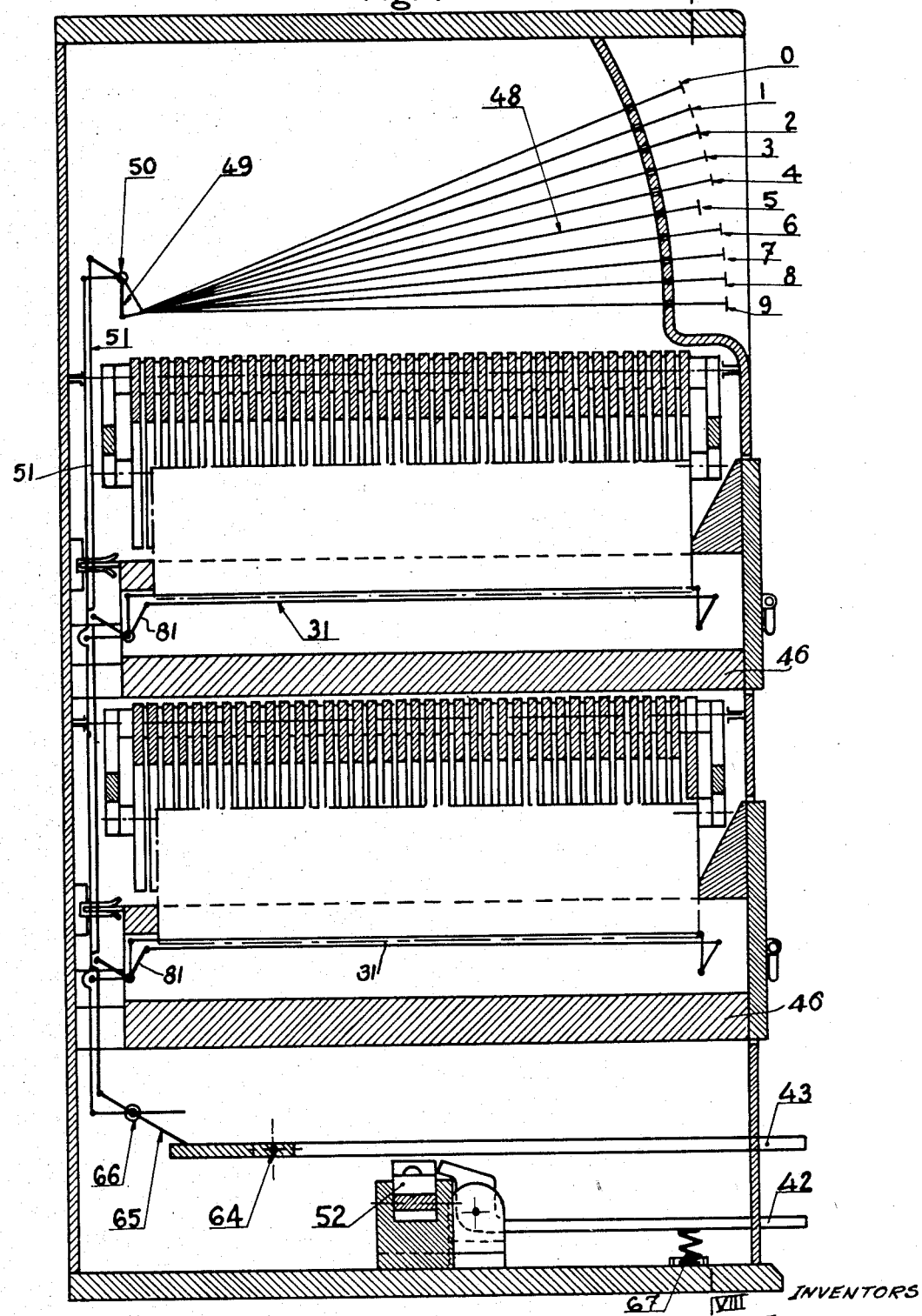

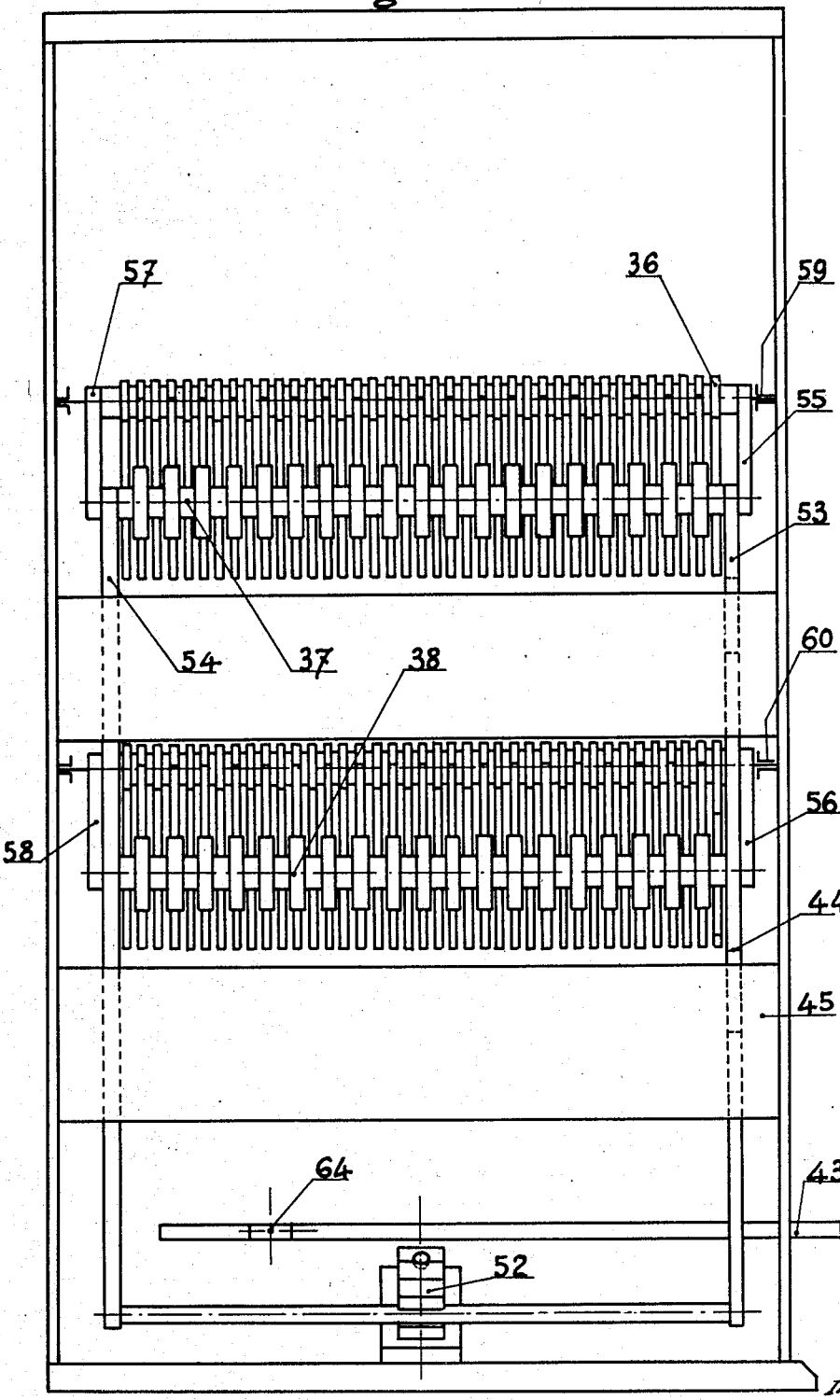

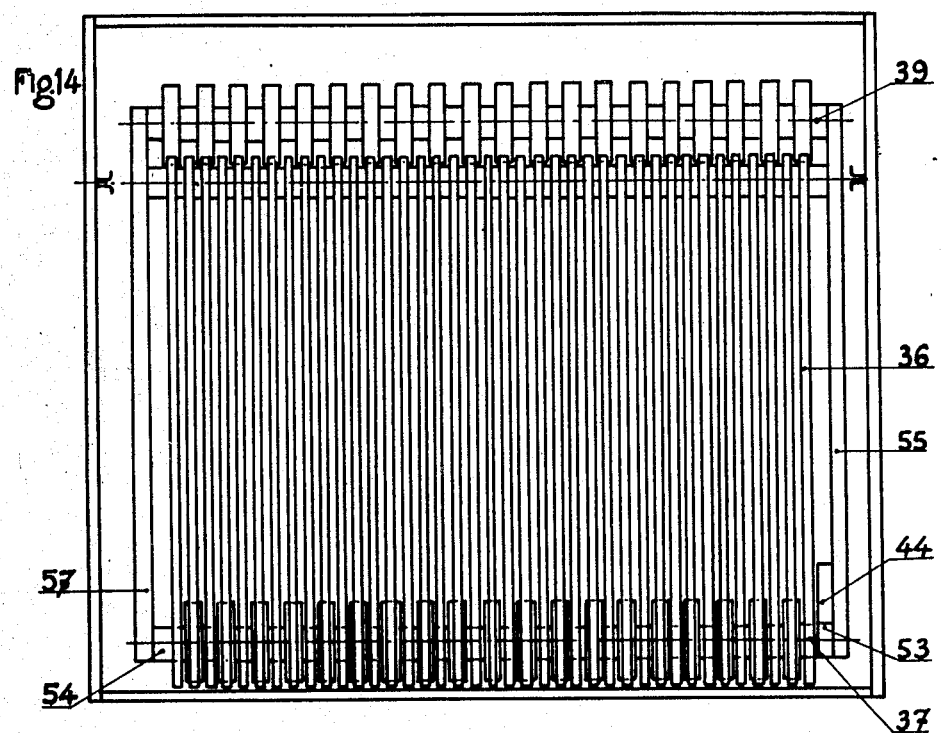
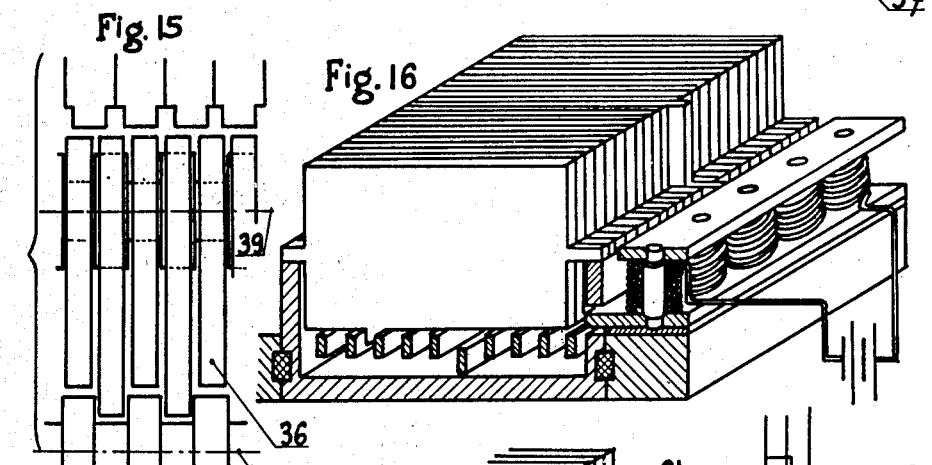
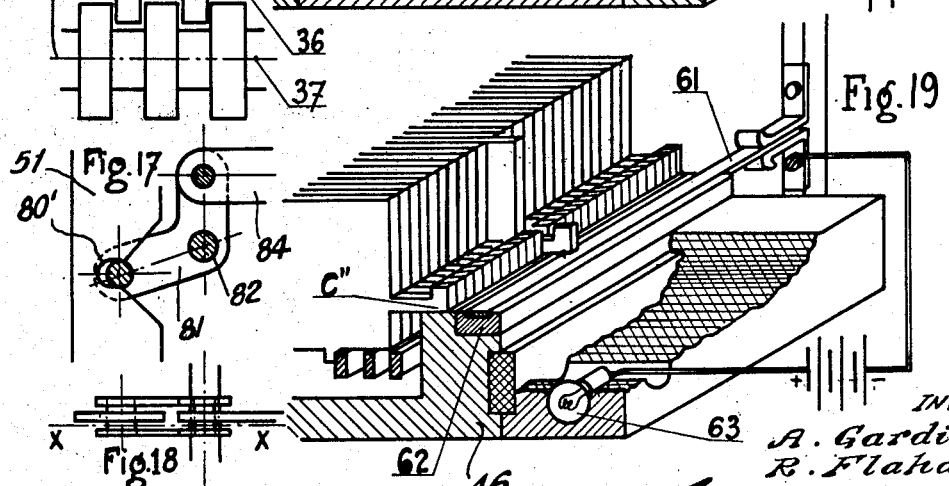

Feb. 7, 1939.  A. GARDIN ET AL  2,146,063
CARD SELECTING DEVICE
Filed Oct. 30, 1934  10 Sheets-Sheet 7
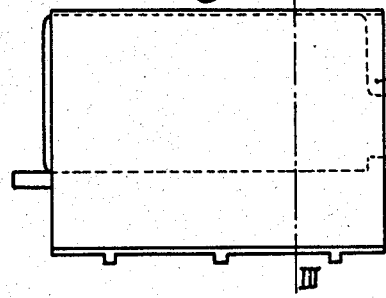
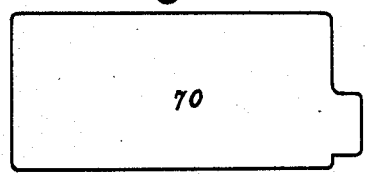
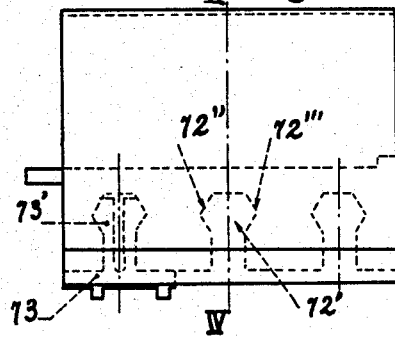
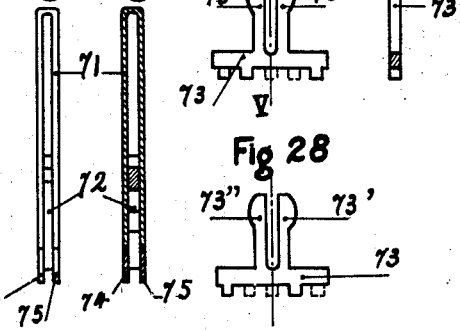
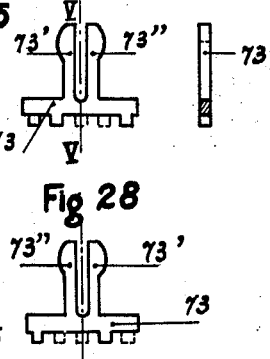
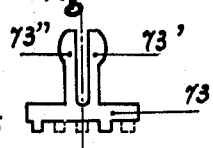
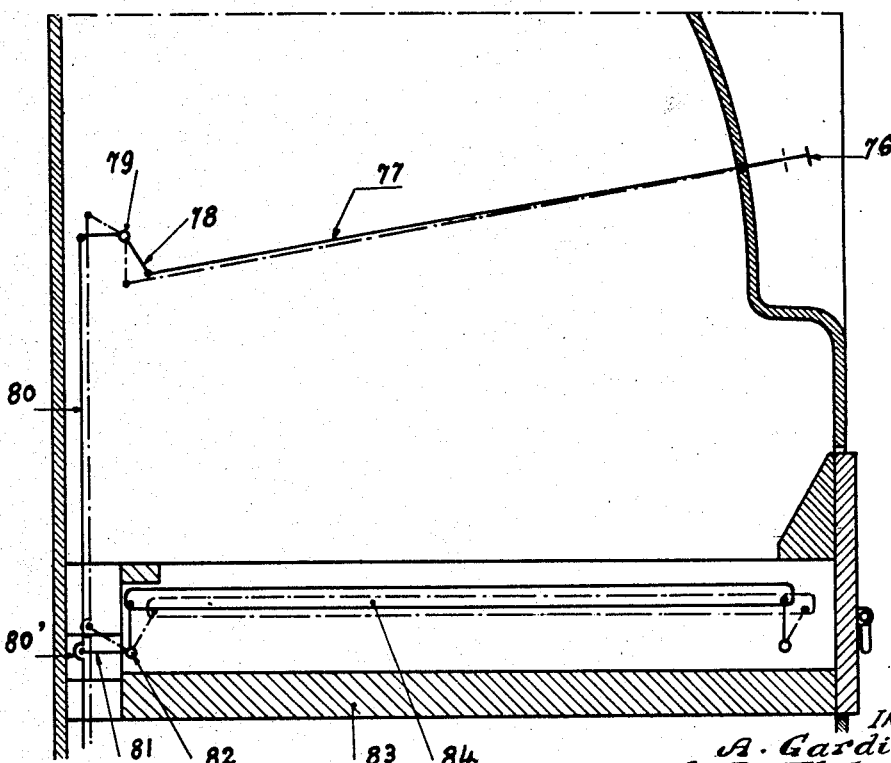
INVENTORS
A. Gardin.
R. Flahaut.
By Lacey Lacey, Attys.

Feb. 7, 1939.  A. GARDIN ET AL  2,146,063
CARD SELECTING DEVICE
Filed Oct. 30, 1934  10 Sheets-Sheet 8
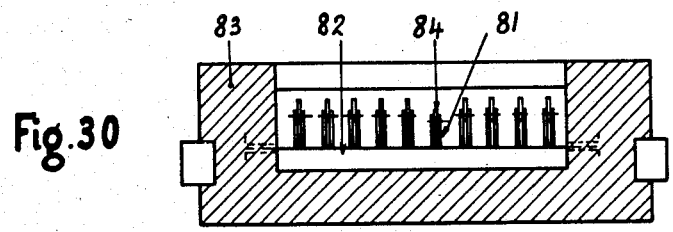
Fig. 30
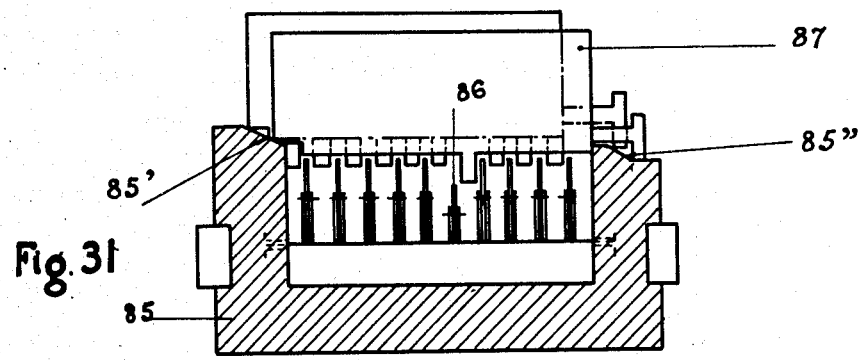
Fig. 31
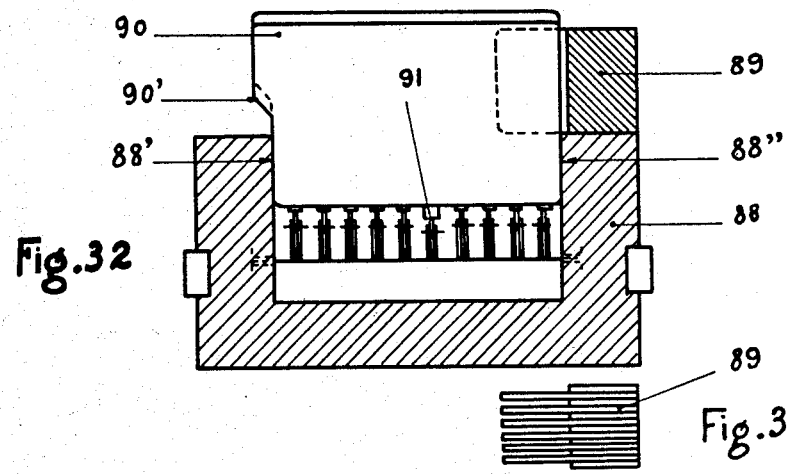
Fig. 32
Fig. 33
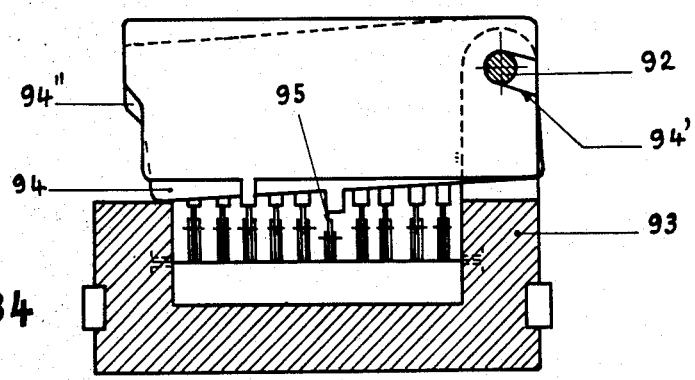
Fig. 34
INVENTORS
A. Gardin.
R. Flahaut.
By Lacey & Lacey,
Attys.

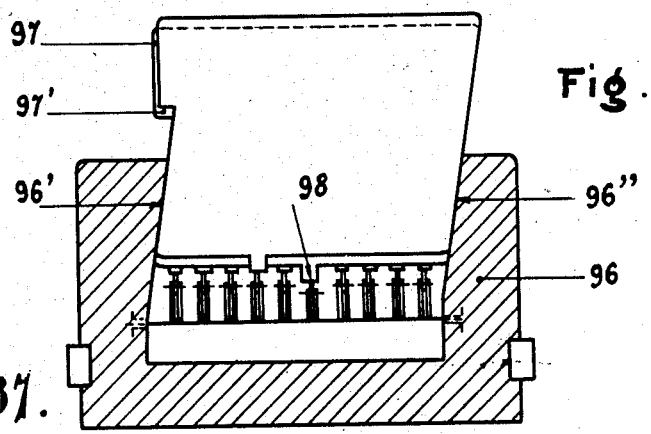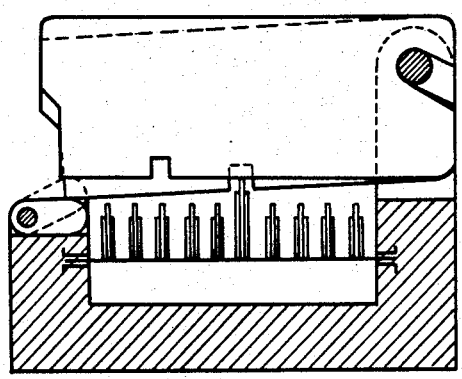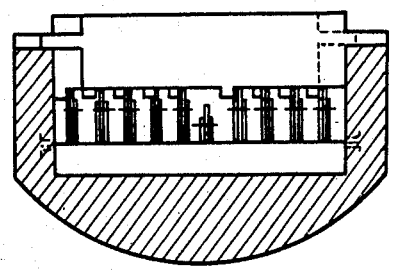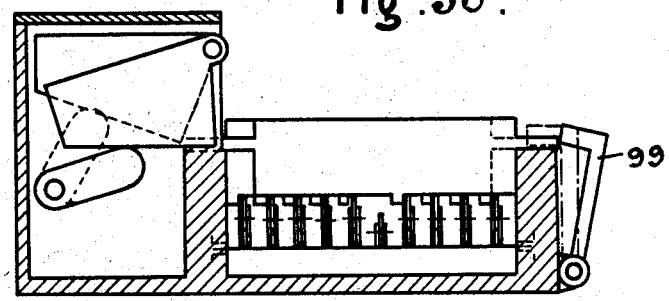

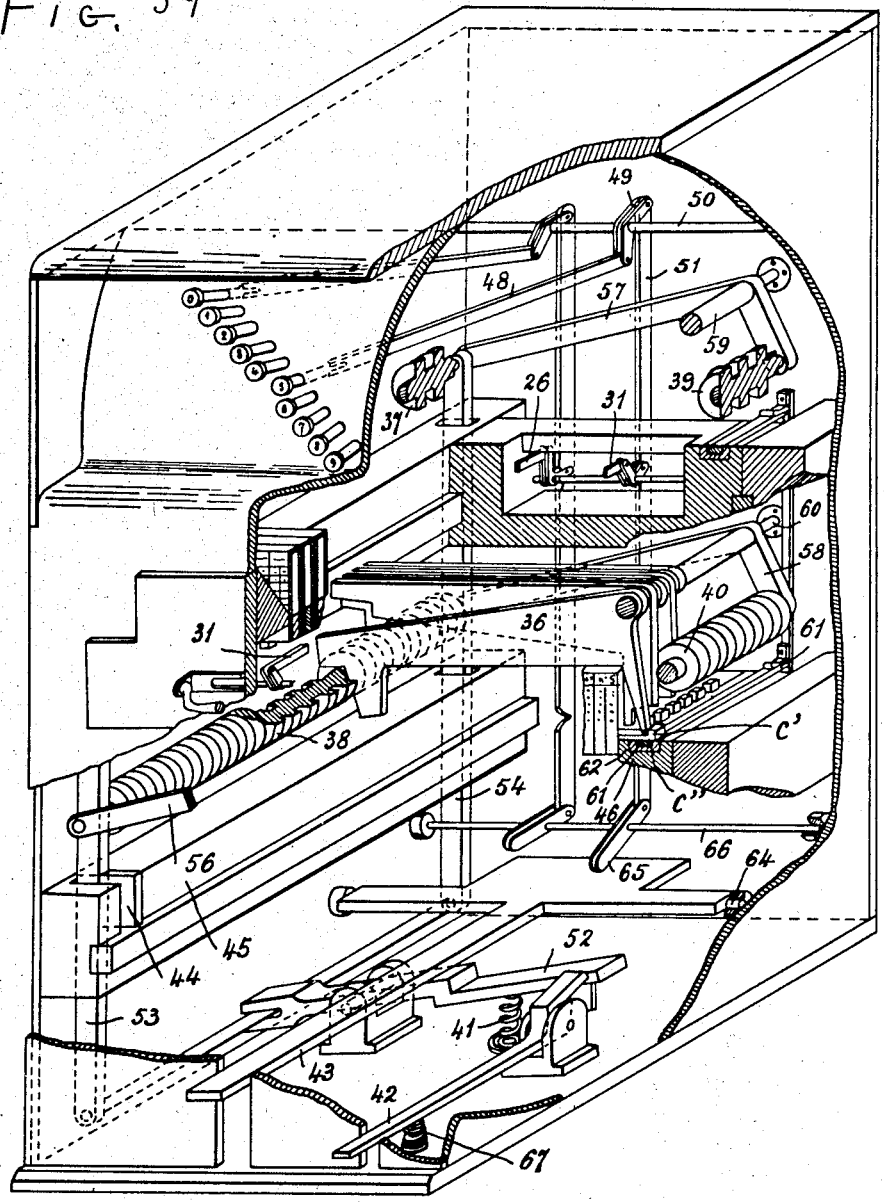

Patented Feb. 7, 1939

2,146,063

UNITED STATES PATENT OFFICE 2,146,063

CARD SELECTING DEVICE

André Gardin and René Flahaut, Pavillons sous Bois, France

Application October 30, 1934, Serial No. 750,718
In France November 3, 1933

13 Claims. (Cl. 129—16.1)

This invention relates to improvements in apparatus for selecting index-slips or any individual documents differentiating from each other by one or more characteristic features.

The improvements forming the subject-matter of the invention avoid the inconveniences of an apparatus such as is shown in French Patent No. 479,575 by simplifying the research of the index-slips, by increasing the capacity of the apparatus and by increasing the possibilities of selections.

They are characterized in the forms of construction illustrated and chosen only by way of example, by new combinations of the fundamental system in which the cards are urged to move by a pressure means and held in place or not by a retaining means. These combinations are effected in such a manner that when the apparatus is manipulated for obtaining the selection of one or more cards, the suitable retaining blades are caused to be retracted, this allowing the cards provided with the corresponding teeth to move under the action of the operating means, either laterally, or obliquely, or vertically, or by rotation, according to the combination contemplated.

The invention moreover relates to improvements in the construction of the cards for assisting in obtaining the above mentioned advantages.

In the accompanying drawings:

Fig. 1 is a front view of the card laid on two supports.

Fig. 2 is a cross section made according to line VII—VII of Fig. 1.

Figs. 3 and 4 are cross sections showing some modifications in the manufacture of the cards.

Fig. 5 shows on a card the respective places reserved for each class and for each division of one and the same class.

Figs. 6 and 7 illustrate, on an enlarged scale, two modifications of Fig. 5.

Fig. 8 illustrates a set of keys and a reference table.

Fig. 9 is a diagrammatic view of a mechanism allowing to effect a double operation by depressing a single key.

Fig. 10 shows the application of an electric mechanism allowing to effect a double operation by depressing a single key.

Fig. 11 is a front sectional view of the apparatus, with a section made according to line VIII—VIII of Fig. 12.

Fig. 12 is a longitudinal section made according to line IX—IX of Fig. 11.

Fig. 13 and 14 are a side view and a plan view, respectively, showing the pressure plates and the comb mechanism.

Figure 15 is an enlarged detail elevation of the structure shown in Figure 14 and showing the relative thicknesses of the pressure plates.

Fig. 16 is an arrangement allowing the substitution of the pressure plates by an electromagnet.

Figure 17 is a detail sectional view on the line X—X of Figure 18, and showing a system for attaching the mechanism of the retaining blades on the link-work controlled by the keys of the keyboard.

Figure 18 is a detail plan view of the structure shown in Figure 17.

Fig. 19 illustrates an electric signalling system.

Fig. 20 is a front view of a pocket card capable of containing a removable index-slip.

Fig. 21 is a cross section made according to line III—III of Fig. 20, the removable index-slip being removed.

Fig. 22 is a front view of the removable index-slip.

Fig. 23 is a front view of a card provided with removable teeth.

Fig. 24 is a side view of Fig. 23, the tooth elements being removed.

Fig. 25 is a cross section made according to line IV—IV of Fig. 23, the tooth elements being removed.

Fig. 26 is a front view of a tooth element.

Fig. 27 is a cross section made according to line V—V of Fig. 26.

Fig. 28 shows the double utilization of a tooth element.

Figs. 29 and 30 are a side sectional view and a transverse sectional view, respectively, showing the operation of the retaining blades.

Fig. 33 is a plan view of a portion of the comb of Fig. 32.

Figs. 31, 32, 34 and 35 are sections of four different drawers, respectively showing the operation of the 2nd, 3rd, 4th and 5th combinations.

Fig. 36 is a modification of Fig. 30.

Fig. 37 shows an example of application of the notched cards.

Fig. 38 illustrates an arrangement in which the pressure blades act by thrust, and also shows a device for replacing the cards in position.

Fig. 39 is a comprehensive view, partly broken away, and showing a perspective of the entire device.

Such as illustrated in Figs. 1 and 2, the card 10 is composed of two sheets $a$ and $b$ made of a material on which it is possible to write (paper, cardboard, etc.) glued or secured on a strip $c$ made of metal or of heavy material, as shown in Fig. 2.

The card being placed on two supports $f$ and $g$, the arrangement adopted procures the following advantages:

1. The card always tends to return to its vertical position, because its center of gravity is placed below its axis of suspension, due to the fact that the strip C is of heavy material.

2. It is easy to incline the card to consult it.

3. The portion $hi$ of the card being much greater than the portion $hj$, the periphery of the card remains visible both at the top and on nearly the totality of its sides, this ensuring a better visibility and allowing a very extensive use of signalling clips.

However, the construction of this card can be different from that above described. Thus:

1. A sheet $d$ can be inserted in a U-shaped armature $e$, the U being at will flattened (Fig. 3) or not at its lower part as indicated (Fig. 4).

2. The card, such as shown (Figs. 20 and 21) can be composed of a U shaped element 68 made of a material on which it is possible to write (paper, cardboard, etc.) glued or secured on a strip 69 made of metal or of heavy material, as shown in Fig. 21. The interior of the U is adapted to receive a removable index-slip 70 (Figs. 20 and 22). This index-slip can also be inserted within the card, provided with removable teeth, shown in Figs. 23, 24 and 25. This latter card is composed of a U-shaped element 71, made of a material on which it is possible to write (paper, cardboard, etc.), glued or secured on a strip 72, made of metal or of a heavy material. This strip is provided with notches 72' in each of which enters a tooth element 73.

This tooth element, as illustrated in Figs. 26 and 27, is constructed in such a manner that its branches 73' and 73'' resiliently distort for allowing them to enter and come out of the notches 72', the nicks 72'' and 72''' of which hold said tooth element in place. In this position, it is laterally held by two strips 74 and 75, made of metal or of heavy material, glued or secured on the strip 72.

A card forms a part of one class or of several classes. These classes can be designated by any expressions, for instance, numerical class, alphabetical class, region class, date class, profession class, etc.

Each class is divided into divisions. Thus, if the numerical class comprises three digits, it will be divided into three divisions: hundreds, tens and units. Each division has one element; each element is physically represented on the card by teeth and characterized by the arrangement of the latter. The classes and divisions have, on the card, a place reserved for the teeth representing their elements. Referring again to the preceding example, the place $pq$ (Fig. 5) is reserved for the teeth representing the hundreds element, the place $qr$ is reserved for the teeth representing the tens element, and the place $rs$ is reserved for the teeth of the units element.

Each element being characterized by the arrangement of the teeth which physically represent it, the card is thus differentiated by all the teeth representing all the elements of one class. The teeth can be arranged on a card in different manners:

1. Simple teeth

Case of a numerical class:

A numerical class of $n$ digits comprises $n$ divisions. A division comprises ten possible elements which are represented on the blank card by ten teeth. For differentiating a card in a class, the teeth corresponding to all the necessary elements are alone maintained for forming a distinction in the class. Example: By counting the teeth from left to right (Fig. 6), the card corresponding to a number such as 35 will keep only, in a numerical class of three digits and therefore of three divisions, the first tooth representing the element 0 of the hundreds (reserved place $pq$), the fourth tooth representing the element 3 in the division of the tens (reserved place $qr$) and the sixth tooth representing the element 5 in the division of the units (reserved place $rs$).

Case of an alphabetical class:

An alphabetical class of $n$ letters comprises $n$ divisions. A division comprises twenty-seven possible elements, one of which is a dummy element, said elements being represented on the blank card by twenty-seven keys.

For differentiating a card in a class, the teeth corresponding to all the necessary elements are alone maintained for forming a distinction in the class.

Example: By counting the teeth from left to right (Figs. 5 and 7) the card corresponding to the letters such as $zy$ will therefore keep only, in an alphabetical class of three letters and therefore of three divisions, the twenty-sixth tooth representing the element $z$ in the first alphabet (reserved place $tu$), the twenty-fifth tooth representing the element $y$ in the second alphabet (place $uv$) and the twenty-seventh tooth representing the absent element in the third alphabet (place $vw$).

Case of multiple classes:

Each card is toothed as if each class were employed alone.

The classes have, on the card, a place reserved for the teeth representing their elements. Thus, the place $kl$ (Fig. 5) is reserved for the teeth representing the elements of a numerical class, the place $lm$ is reserved for the teeth representing the elements of any class, and the place $mn$ is reserved for the teeth representing the elements of an alphabetical class.

The removal of a card will be possible only after retracting the retaining blades corresponding to the teeth differentiating the card in the class employed.

Each retaining blade is controlled by a linkwork at the end of which a key is arranged. The indication marked on each key allows to rapidly detect those which are to be operated.

2. Double teeth

Case of a numerical class:

A numerical class of $n$ digits comprises $n$ divisions. A division comprises ten possible elements for the representation of which the blank card carries five teeth utilizable in pairs. Each combination of two teeth representing an element, it is possible to maintain, among others:

```
The first and the second tooth for representing element 0
The 1st and the 3rd tooth for representing element 1
The 1st and the 4th tooth for representing element 2
The 1st and the 5th tooth for representing element 3
The 2nd and the 3rd tooth for representing element 3
The 2nd and the 4th tooth for representing element 4
The 2nd and the 5th tooth for representing element 5
The 3rd and the 4th tooth for representing element 6
The 3rd and the 5th tooth for representing element 7
The 4th and the 5th tooth for representing element 9
```

Case of an alphabetical class:

An alphabetical class of $n$ letters comprises $n$ divisions. A division comprises twenty-seven possible elements (twenty-six effective elements and one dummy element) for the representation of which the blank card carries eight teeth utilizable per pair. Each combination of two teeth representing an element, it is possible to maintain among others:

```
The first and the second tooth for representing element A
The 1st and the 3rd tooth for representing element B
The 1st and the 4th tooth for representing element C
The 1st and the 5th tooth for representing element D
The 1st and the 6th tooth for representing element E
The 1st and the 7th tooth for representing element F
The 1st and the 8th tooth for representing element G
The 2nd and the 3rd tooth for representing element H
The 2nd and the 4th tooth for representing element I
The 2nd and the 5th tooth for representing element J
The 2nd and the 6th tooth for representing element K
The 2nd and the 7th tooth for representing element L
The 2nd and the 8th tooth for representing element M
The 3rd and the 4th tooth for representing element N
The 3rd and the 5th tooth for representing element O
The 3rd and the 6th tooth for representing element P
The 3rd and the 7th tooth for representing element Q
The 3rd and the 8th tooth for representing element R
The 4th and the 5th tooth for representing element S
The 4th and the 6th tooth for representing element T
The 4th and the 7th tooth for representing element U
The 4th and the 8th tooth for representing element V
The 5th and the 6th tooth for representing element W
The 5th and the 7th tooth for representing element X
The 5th and the 8th tooth for representing element Y
The 6th and the 7th tooth for representing element Z
The 6th and the 8th tooth for representing element dummy
```

Case of multiple classes (continued):

Each card is toothed as if each class were employed alone. The removal of a card will be possible only after retracting the retaining blades corresponding to the teeth which differentiate the card in the class employed.

Each retaining blade is controlled by a linkwork at the end of which a key is arranged. All the keys corresponding to a division are placed obliquely, as shown in Fig. 8. A reference table allows the rapid detection of the keys which are to be operated (Fig. 8). For instance, to letter G corresponds the first and the last key.

3. Any number of teeth

Generally speaking, $n$ teeth are utilizable for representing all the possible elements of a division. Each element can be represented by the combination of $n$ teeth.

Example: If in a numerical class comprising a single division (units) the blank card carries seven teeth, the latter can be used in the following manner for characterizing each of the elements (the teeth being counted from left to right, Fig. 9):

```
The second and the third tooth for representing element 0
The 1st and the 3rd tooth for representing element 1
The 2nd and the 4th tooth for representing element 2
The 1st and the 4th tooth for representing element 3
The 2nd and the 5th tooth for representing element 4
The 1st and the 5th tooth for representing element 5
The 2nd and the 6th tooth for representing element 6
The 1st and the 6th tooth for representing element 7
The 2nd and the 7th tooth for representing element 8
The 1st and the 7th tooth for representing element 9
```

This other arrangement of sets of teeth comprising two teeth is indicated herein, because it allows, by means of a simple mechanism, to obtain the retraction of two retaining blades by the depression of a single key. Fig. 9 diagrammatically illustrates how this mechanism can be constructed:

With a set of teeth of any type (comprising a single tooth, two teeth, or $n$ teeth), the same result can be obtained by means of an electric mechanism. Fig. 10 illustrates an application of the latter in the case of a numerical class having a single division, the possible elements of which, ten in number, are represented on the blank card by five teeth employed per pair. Each combination of two teeth representing an element, we have maintained:

```
The first and the second tooth for representing element 0
The 1st and the 3rd tooth for representing element 1
The 1st and the 4th tooth for representing element 2
The 1st and the 5th tooth for representing element 3
The 2nd and the 3rd tooth for representing element 4
The 2nd and the 4th tooth for representing element 5
The 2nd and the 5th tooth for representing element 6
The 3rd and the 4th tooth for representing element 7
The 3rd and the 5th tooth for representing element 8
The 4th and the 5th tooth for representing element 9
```

As illustrated, each retaining blade is actuated by an electromagnet which operates when a key closes its circuit. If the cards bearing the digit 7 are desired, the key bearing this digit (key 18, Fig. 10) is depressed; the retaining blades 23 and 24, which correspond to the third and to the fourth tooth, move away for allowing the desired cards to slip out.

*Remark 1.*—As each tooth element has teeth the position of which characterizes the division element such as that just defined, there will be as many notches 72' in the card provided with a removable tooth element (Figs. 23, 24 and 25) as there are divisions in all the classes taken together. On each tooth element, the position of the teeth corresponds to the tooth system employed. Thus, in the case of a set of teeth having two teeth for a numerical class, the element corresponding to a number such as 6 keeps only the 2nd and the 5th teeth (Fig. 26).

*Remark 2.*—The same tooth element can serve for representing two different division elements, according to the direction in which it is placed in the card. Being placed as indicated in Fig. 28, it represents the element corresponding to a number such as 2 (the 1st and 4th teeth being maintained).

*Remark 3.*—By their very construction, the cards have their teeth offset relatively to their faces, as shown in Figs. 2, 3, 21 and 23. It is thus possible to prevent a card, when being removed, from engaging with the adjacent stationary cards, as the teeth may be distorted by use.

In the mechanism of the 1st combination illustrated (Figs. 11, 12, 13 and 14) which serves to effect the selecting operations, there are as many retaining blades 26 to 35 (Fig. 11) mounted in the drawers as there are teeth on a blank card. The whole of these blades forms a kind of grid in the grooves of which fit the teeth of the cards. Owing to their assemblage in the form of a parallelogram, the retaining blades can be retracted for allowing the passage of the teeth in front of which they are located. This retraction is obtained by the operation of a linkwork controlled by keys 0 to 9 (Fig. 12). The lateral displacement of the cards is obtained by means of pressure plates 36 (Figs. 11, 13, 14 and 15) which act by gravity.

The latter are arranged in such a manner that they bear, when this is necessary, simultaneously on all the cards at the same time and on each of them separately. By this arrangement the cards, the teeth of which are no longer stopped by the retaining blades, can laterally slide to the exclusion of the others. The pressure plates are guided in parallel and axially displaced combs 37 to 40 (Figs. 11, 13, 14 and 15), which hold them at a suitable distance apart so that there is at least always one pressure plate opposite each card. It should be understood that the combs engage the pressure plates frictionally so as to permit shifting of said plates.

The pressure plates, driven by friction and by their own weight, follow their abutment (comb) in its displacement and come in contact with the projection c' (Figs. 1, 5 and 11) of the cards. The latter are then urged to move laterally, but only those can move which are not held by the retaining blades.

*Remark.*—The action of the pressure plates can be replaced by the pull exerted by an electromagnet on the metal part of the cards. Fig. 16 shows a means allowing to effect this mode of operation.

When the large pedal 43 is depressed, the latter, at the same time as it lifts the pressure plates, also restores the retaining blades to their uppermost position. It is thus possible to effect a new selection. For rendering the drawers and retaining blades independent of the cabinet or piece of furniture containing them, a system for attaching the mechanism of the retaining blades on the linkwork controlled by the keys of the keyboard is provided. This attaching system is illustrated in elevation (section X—X, Fig. 17) and in plan view in Figs. 17 and 18, respectively.

For preventing faulty operations, a safety device prevents, on the one hand, the opening of a drawer when the pressure plates enter in action and, on the other hand, this device prevents the same pressure plates from entering in action when a drawer is opened. This result is obtained by securing a safety member 44 (Figs. 11, 13 and 14) on the front rod 53 (Figs. 11, 13 and 14) of the four-bar motion supporting the combs. A hole, straddling the slide 45 (Figs. 11 and 13) and the drawer 46 (Fig. 11) allows, only when the drawer is completely closed, the passage of the safety member 44; when the said member has entered the hole, it is impossible to open the drawer which is locked on its slide.

The removal of one or more cards is revealed in a drawer by the lateral displacement of the selected card or cards, the margins of which appear on the edge of the other cards which have remained in position. If the apparatus comprises a plurality of drawers, those containing the selected cards are indicated by the lighting of the lamp 63 corresponding to each of them. This lamp lights when a card, through its metallic end c'' (Figs. 11 and 19), closes the circuit of the source of electric supply feeding it with current. In more detail, only one wire is shown in Figure 19 because the circuit is closed through the metallic body of the apparatus. The circuit goes from the insulated bar 61 through the single wire to the battery and thence to the central contact of the lamp 63. From the other contact of the lamp the circuit is continued through the body of the apparatus to the metallic ends c'' of the cards. As soon as one of the cards is shifted to the right its metallic end c'' touches the bar 61 and closes the circuit so that the lamp 63 is lighted.

When it is desired to find a card in a class, the retaining blades of all the other classes are first caused to be retracted; then, the keys of the keyboard 47 (Fig. 11), which correspond to the characteristic features of the card in question, are depressed; this operation causes the retraction of the suitable retaining blades. Then, by pressing on the pedal 42, the pressure plates are released; the desired card then laterally slides and causes the lamp designating the drawer in which the card is located, to be lighted. When the large pedal 43 has been depressed for releasing the drawer and when the latter is opened, the selected card will be seen by the fact that it laterally extends beyond all the other cards which have remained in position.

Figs. 11, 12, 13 and 14 diagrammatically illustrate a filing cabinet provided with two drawers. In these drawers are placed, in any order whatever, but with their faces on the same side, cards each designated by a digit from 0 to 9 (this being obviously a case which is easy to illustrate). These cards therefore belong to a single class having a single division, the element of which has been physically represented by simple teeth.

If, for instance, the card bearing No. 5 is desired, the key 5 (Fig. 12) is depressed, this key controlling a rod 48 (Fig. 12) which engages with a right-angled member 49 (Fig. 12) rotating about a fixed shaft 50 (Figs. 11 and 12); this right-angled member lifts the vertical link 51 (Fig. 12) and the latter actuates and causes the retraction of the retaining blades 31 (Figs. 11 and 12) forming an element of a parallelogram as indicated (Fig. 12). Then, the small pedal 42 is depressed and the lever 52 (Figs. 11, 12 and 13) is thus released. This lever 52 always urged by a spring 41, engages, through its forked end 52' (Fig. 11), a jointed system constituted by bars 53 to 58 (Figs. 11, 13 and 14).

These bars rotating about fixed shafts 59 and 60 (Figs. 11 and 13) lower the combs 37 and 38 which support the pressure plates. The latter, driven both by the slight friction of the combs and by their own weight, lower by rotating about the fixed shafts 59 and 60. They then bear upon the cards which, abutting against the retaining blades 26, 27, 28, 29, 30, 32, 33, 34 and 35, resist to their pressure. The wire connections between the metallic ends c'' of the cards, the battery and the lamp have been heretofore described, therefore, the card bearing No. 5, for example, which is not abutting against a retaining blade is laterally movable and has its metallic end c'' contacting a bar 61 insulated from the drawer by an insulating channel member 62 (Figs. 11 and 19). This contact, by closing the circuit of a source of electric supply, lights and lamp 63 (Fig. 19) which corresponds to the drawer 46 in which the card bearing No. 5 is placed. But this drawer has been locked on its slide 45 by the safety member 44, upon downward movement of the rod 53. For unlocking it, the large pedal 43 which has been raised by the lever 52, upon the movement of the latter, is depressed. Under the action of the operator, the large pedal rotates about the fixed shaft 64 (Figs. 11 and 12) and effects the two following operations: on the one hand, it causes the lever 65 (Fig. 12) to rock about the fixed shaft 66 (Figs. 11 and 12); this lever actuates the rod 51 which causes the key 5 to rise and lifts the retaining blade 31; on the other hand, it pushes the lever 52 which causes, through the medium of the bars 53 and 54, the combs 37 and 38 to return to their upper position. The pressure plates raised by the combs, then cease to press upon the cards. At the same time, the safety members, rigid with the bar 53, unlock the drawers from their slide. The drawers can then be opened and it is easy to find, in the drawer the signalling lamp of which is lighted, the card bearing No. 5, which differentiates from the others by its lateral displacement.

During its downward stroke, the large pedal has caused the small pedal 42 to engage with the lever 52, this small pedal 42 being always pushed towards its uppermost position by the spring 67 (Fig. 12). The apparatus is then again in the initial conditions and, once all the drawers have been reclosed, it will be possible to effect another selection.

For facilitating the description, the drawings of the 2nd, 3rd, 4th and 5th combinations are diagrammatic drawings illustrating simple cases, but it is to be understood that the invention is not limited to these particular cases and to the characteristic features of construction and arrangement which have been set forth. Moreover, in order that the operation of these four combinations should be more clearly understood, the figures relating thereto illustrate the case of a numerical class having a single digit and the system of simple teeth (one tooth reserved for each digit) has been used.

Figs. 29 and 30 show the operation of the retaining blades above described. By depressing a key, for instance the key 76, the rod 77 is driven in, this causing the right-angled member 78 to rock about the fixed shaft 79. This right-angled member actuates a link 80 which, by means of its fork 80', causes the right-angled member 81 to pivot about the shaft 82 rigid with the drawer 83. The right-angled member 81 then lowers the retaining blade 84 which assumes the position illustrated in dot and dash lines.

The 2nd combination such as in Figure 31 presents, relatively to the 1st combination, the following differences:

1. The displacement of the card in its plane takes place obliquely relatively to the axes of symmetry of its teeth, instead of taking place at right angles to the said axes.
2. The means for moving the cards is assisted by the weight of the latter.

The 3rd combination, Figure 32, presents, relatively to the 1st combination, the following differences:

1. The displacement of the card in its plane takes place parallel to the axes of symmetry of its teeth.
2. The retaining blade is placed underneath the tooth it must stop, instead of being placed on the side of the latter.
3. The means for moving the cards can be simply the weight of the latter.

The 4th combination, Figure 34, presents, relatively to the 1st combination, the following differences:

1. The card rotates in its plane about a point and, in its displacement, the axes of symmetry of its teeth change their orientation relatively to the plane of a retaining blade.
2. The retaining blade is placed underneath the tooth it must stop.
3. The means for moving the cards can be simply the weight of the latter.

The 5th combination, Figure 35, presents, relatively to the 1st combination, the following differences:

1. The displacement of the card in its plane takes place obliquely relatively to the axes of symmetry of its teeth.
2. The retaining blade is placed underneath the tooth it must stop.
3. The means for moving the cards can be simply the weight of the latter.

Fig. 31, illustrating the second combination, is a section of the drawer such as it might be placed in the selecting apparatus in the place and stead of the drawer 83 (Fig. 30).

In this second combination, the oblique displacement of the card is obtained by means of inclines 85' and 85" provided on the edges of the drawer 85. The card, owing to these inclines, laterally moves under the action of the pressure plates and, at the same time, moves down under the action of its own weight; the latter moreover assists in the lateral displacement.

*Example of operation.*—Being only provided with the tooth corresponding to the retaining blade 86, the card 87, which primitively was in the position illustrated in dot and dash lines (Fig. 31), moves, when the retaining blade 86 is lowered, to the position shown in full lines. As shown in Fig. 31, this card thus selected is laterally displaced to the extent of the interval comprised between the axes of two consecutive retaining blades; it then easily differentiates from the other cards.

Such as illustrated in Fig. 32, the card, in the third combination, is no longer provided with suspension lugs; it bears, through its tooth, upon a retaining blade and is guided by the ledges 88' and 88" of the drawer 88; moreover, it is held in a plane at right angles to the retaining blades by a comb 89 (Figs. 32 and 33) composed of small plates suitably arranged.

When the selection of a card, 90 for instance, is effected, the retaining blade 91, corresponding to the characteristic feature of this card, is lowered; the said card, carrying only the tooth which bears upon the retaining blade 91, moves down under the action of gravity. This card, thus selected, easily differentiates from the other by the fact that its portion 90', provided for that purpose, extends beyond the other cards.

Such as illustrated in Fig. 34, the card, in the fourth combination bears, through its tooth, upon a retaining blade. On the other hand, it is held in a vertical plane by a pin 92 rigid with the drawer 93. The card can be inserted in position or removed owing to an opening 94' provided for that purpose in said card. When the selection of a card, 94 for instance, is effected, the retaining blade 95, corresponding to the characteristic feature of this card, is lowered; the said card, carrying only the tooth bearing on the retaining blade 95, can then, under the action of gravity, rotate about the pin 92. This card, thus selected, easily differentiates from the others by the fact that its portion 94", provided for that purpose, extends beyond the other cards.

Such as illustrated in Fig. 35, the card, in the fifth combination, is in the shape of a parallelogram; it bears, through its tooth, on a retaining blade and is guided by the ledges 96' and 96" of the drawer 96. The inclination of these ledges prevents the card from rotating about its base. When effecting the selection of a card, 97 for instance, the retaining blade 98, corresponding to the characteristic feature of this card, is lowered; the said card, carrying only the tooth which bears upon the retaining blade 98, moves down under the action of gravity; the inclination of the ledges of the drawer compels it at the same time to move laterally. This card, thus selected, easily differentiates from the others by the fact that its portion 97', provided for that purpose, extends beyond the other cards.

The action of the pressure plates can be replaced, as shown in Fig. 36, by the weight of the cards, which are caused to slide by causing the apparatus to roll on its base which is accordingly given a rounded shape.

In the five combinations—cards, retaining means and pressure means—described above, the card is provided with teeth intended to serve as abutments. In each of these combinations, it is possible to replace the teeth by notches, the operation being then slightly different as illustrated in Fig. 37; whereas in the combinations above described it is necessary, for selecting a card, to lower the retaining blades which are located in front of the teeth characterizing it, if notches are used instead of teeth, the retaining blades must be raised in the notches which characterize the desired card. Of course, the substitution of notches for teeth, is not only applicable to the combination illustrated in Fig. 37, but also to all the other combinations described in the present patent. Such as illustrated in Fig. 38, the pressure plates, instead of pulling the cards, can push them.

When the apparatus is caused to operate, the cards are all subjected to the action of a stress which tends to move them. They therefore exert, except those to be found, a pressure upon the retaining blades. Consequently, before again operating the latter, it is necessary to release them from the friction caused by their contact with the cards. For that purpose, use can be made of a set of small plates similar to the pressure plates, but acting in reverse direction. The releasing device for the retaining blades can be constituted by a member 99, as diagrammatically illustrated in Fig. 38.

We claim:

1. An apparatus for selecting unclassified index cards comprising a drawer, cards therein, retaining blades normally cooperating with teeth on an edge of each card so as to immobilize said card, one characteristic being represented by a division on the edge of each card, teeth provided on an edge of each card in each division and representing in combination one characteristic, keys for retracting said retaining blades for freeing all the corresponding teeth, the number of keys and blades in each division being smaller than the number of characteristics represented in said division, means for connecting more than one blade to one key to be actuated so as to retract the retaining blades corresponding to the characteristic to be selected, and a pressure plate for each card for exerting thereon a force tending to shift it in its plane.

2. An apparatus for selecting unclassified index cards including identification characteristics on their edges, which apparatus comprises a drawer, retaining blades normally cooperating with said characteristics for immobilizing the cards, means for selectively retracting said retaining blades so as to free the cards having characteristics corresponding to said blades, pressure plates for exerting on all the cards individually and simultaneously a force tending to shift them in their respective planes within the drawer, and means for guiding said pressure plates.

3. An apparatus for selecting unclassified index cards including identification characteristics on their edges, retaining blades normally cooperating with said characteristics for immobilizing the cards, means for selectively retracting said retaining blades so as to free the cards having characteristics corresponding to said blades, and means for exerting on all the cards individually and simultaneously a force tending to shift them in their respective planes, said last mentioned means comprising pressure plates mounted above the cards and shiftable into engagement with portions thereof whereby to effect the shifting operation.

4. An apparatus for selecting unclassified index cards including identification characteristics on the edges of said cards comprising a casing, drawers in the casing, retaining blades shiftably mounted in the drawers and normally cooperating with said characteristics so as to immobilize said cards and adapted to be selectively retracted for freeing said cards, actuating means mounted in said casing for selectively retracting said retaining blades, disengageable coupling means provided on said actuating means and retaining blades for engagement when the drawers are in place and adapted to be disengaged when the drawers are withdrawn, and releasable means for exerting upon the cards individually and simultaneously a force tending to shift them in their plane.

5. An apparatus for selecting unclassified index cards including identification characteristics on the edges of said cards comprising a casing, drawers in the casing, cards in said drawer, retaining blades shiftably mounted in the drawers and normally cooperating with said characteristics so as to immobilize said cards and adapted to be retracted for freeing said cards, actuating means mounted in said casing for selectively retracting said retaining blades, disengageable coupling means provided on said actuating means and retaining blades for engagement when the drawers are in place and adapted to be disengaged when the drawers are withdrawn, releasable means for exerting upon the cards individually and simultaneously a force tending to shift them in their plane, said last mentioned means comprising pressure plates shiftable in the casing parallel to the cards and having a smaller thickness than said cards, means for shifting said pressure plates against the edges of the cards, releaseable retaining means mounted in the casing for retaining said pressure plates in an inoperative position, and locking means provided on said retaining means for locking the drawers in closed position when said retaining means are released.

6. An apparatus for selecting index cards comprising a card container, cards in the container, teeth provided on each card for identifying said cards, retaining blades adapted to form abutments for said teeth so as to retain the cards in a set position, means for selectively retracting said retaining blades so as to free the cards which have teeth abutting against said blades, means for exerting on each card a force tending to shift the cards in their respective planes, the last mentioned means comprising pressure plates acting by their own weight, parallel to each other and having such a thickness that it is possible to provide a sufficient number of pressure plates for subjecting every card to the pressure of at least one pressure plate, without the last mentioned pressure plate acting upon the adjacent cards, combs guiding the pressure plates in such manner that said pressure plates are displaceable only in their respective planes and that the said pressure plates are positioned at a distance apart so that there is always at least one pressure plate opposite any possible position of each card, and a movable abutment adapted to retain said pressure plates in an inoperative position and adapted to be disposed so as to free the pressure plate.

7. An apparatus for selecting index cards comprising a card container, cards in the container, teeth provided on each card for identifying said cards, retaining blades adapted to form abutments for said teeth so as to retain the cards in a set position, means for selectively retracting said retaining blades so as to free the cards which have teeth abutting against said blades, and means for exerting on each card a force tending to shift the cards in their respective planes, the last mentioned means comprising pressure plates constituted by plates tending to displace themselves by their own weight, the edges of said pressure plates pressing against portions of the edges of the cards, the pressure plates pressing against portions of retained cards being retained by these cards, while the pressure plates pressing against portions of freed cards shift the last mentioned cards, the weight of a pressure plate being sufficient to shift a card.

8. An apparatus for selecting index cards comprising a card container, cards in the container, teeth provided on each card for identifying said cards, retaining blades adapted to form abutments for said teeth so as to retain the cards in a set position, means for selectively retracting said retaining blades so as to free the cards which have teeth abutting against said blades, and means for exerting on each card a force tending to shift the cards in their respective planes, the last mentioned means comprising pressure plates acting by their own weight, parallel to each other and having such a thickness that it is possible to provide a sufficient number of pressure plates for subjecting every card to the pressure of at least one pressure plate without said last mentioned pressure plate acting upon the adjacent cards.

9. An apparatus for selecting index cards comprising a card container, cards in the container, teeth provided on each card for identifying said cards, retaining blades adapted to form abutments for said teeth so as to retain the cards in a set position, means for selectively retracting said retaining blades so as to free the cards which have teeth abutting against the said blades, and means for exerting on each card a force tending to shift the cards in their respective planes, the last mentioned means comprising pressure plates acting by their own weight, parallel to each other, combs guiding said pressure plates in such manner that the said pressure plates are displaceable only in their respective planes and that said pressure plates are positioned at a distance apart so that there is always at least one pressure plate opposite any possible position of each card.

10. An apparatus as claimed in claim 9, wherein the combs are displaceable between two positions in one of which said combs retain the pressure plates in an inoperative position, while in the other position said combs free the pressure plates.

11. An apparatus as claimed in claim 9, wherein the combs are displaceable between two positions in one of which said combs retain the pressure plates in an inoperative position, while in the other position said combs free the pressure plates, said combs frictionally engaging said pressure plates so that the combs when they are displaced from the first to the second position draw along by friction the pressure plates which are free for displacement.

12. An apparatus for selecting index cards comprising a casing, drawers in the casing, cards in the drawers, teeth provided on each card for identifying said cards, retaining blades adapted to form abutments for said teeth so as to retain the cards in a set position, means for selectively retracting said retaining blades so as to free the cards which have teeth abutting against said blades, means for exerting on each card a force tending to shift the cards in their respective planes, the last mentioned means comprising pressure plates parallel to each other and having such a thickness that it is possible to provide a sufficient number of pressure plates for subjecting every card to the pressure of at least one pressure plate without the last mentioned pressure plate acting upon the adjacent cards, retaining means adapted to retain the pressure plates in an inoperative position and to be displaced so as to free the pressure plates, and locking means operated by said retaining means and locking the drawers in closed position when said retaining means is displaced so as to free the pressure plates.

13. An apparatus of the class described including a cabinet, drawers therein adapted to receive cards, releasable means for holding the drawers in said cabinet, teeth on said cards and representing characteristics, retaining blades normally cooperating with the teeth on the cards so as to retain said cards in a set position, means for retracting the retaining blades cooperating with the teeth representing in combination a characteristic to be selected whereby to free the last mentioned teeth, means for releasing the drawers and permitting opening thereof, and means for exerting a force on the cards tending to shift them individually and simultaneously in their respective planes, said means comprising a pressure plate parallel to each card and having a smaller thickness than the latter, combs guiding said pressure plates in such a manner that there is always a pressure plate in position for actuating each card, means for originally setting pressure plates against certain edge portions of the cards, and combs shiftable for retaining said pressure plates in an inoperative position.

ANDRÉ GARDIN.
RENÉ FLAHAUT.